United States Patent
Hayashi

(10) Patent No.: US 8,703,356 B2
(45) Date of Patent: Apr. 22, 2014

(54) SEPARATOR OF FUEL BATTERY, METHOD OF JOINING SEPARATOR, AND FUEL BATTERY

(75) Inventor: Tomokazu Hayashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1512 days.

(21) Appl. No.: 11/587,565

(22) PCT Filed: Apr. 27, 2005

(86) PCT No.: PCT/JP2005/008469
§ 371 (c)(1),
(2), (4) Date: Oct. 25, 2006

(87) PCT Pub. No.: WO2005/106998
PCT Pub. Date: Nov. 10, 2005

(65) Prior Publication Data
US 2007/0231661 A1  Oct. 4, 2007

(30) Foreign Application Priority Data
Apr. 30, 2004  (JP) .................. 2004-135010

(51) Int. Cl.
*H01M 8/02*  (2006.01)
*H01M 8/10*  (2006.01)

(52) U.S. Cl.
USPC ........................... 429/509; 429/507; 429/514

(58) Field of Classification Search
USPC ................ 429/34–36, 38, 507–510
See application file for complete search history.

(56) References Cited

U.S. PATENT DOCUMENTS

| | | | |
|---|---|---|---|
| 2002/0031698 A1* | 3/2002 | Inoue et al. | 429/35 |
| 2002/0187384 A1 | 12/2002 | Kato et al. | |
| 2002/0197519 A1* | 12/2002 | Einhart et al. | 429/32 |
| 2003/0198857 A1* | 10/2003 | McManus et al. | 429/38 |
| 2004/0023099 A1 | 2/2004 | Akiyama et al. | |
| 2004/0168306 A1 | 9/2004 | Kamiyama et al. | |
| 2004/0191409 A1* | 9/2004 | Machida et al. | 427/115 |
| 2004/0258977 A1* | 12/2004 | Frank et al. | 429/35 |

FOREIGN PATENT DOCUMENTS

| | | | |
|---|---|---|---|
| DE | 102 25 210 A1 | 2/2003 | |
| EP | 1 406 326 A1 | 4/2004 | |
| JP | A-8-1936 | 1/1996 | |
| JP | 09147890 A * | 6/1997 | H01M 8/02 |
| JP | A-9-147890 | 6/1997 | |
| JP | A 2000-048832 | 2/2000 | |
| JP | A 2001-110436 | 4/2001 | |
| JP | A 2002-15751 | 1/2002 | |

(Continued)

OTHER PUBLICATIONS

Machine Translation of JP 2003-022826.*

(Continued)

*Primary Examiner* — Jonathan Crepeau
*Assistant Examiner* — Jacob Buchanan
(74) *Attorney, Agent, or Firm* — Oliff PLC

(57) ABSTRACT

In a separator member to be joined to an adjacent member adjacent thereto with an adhesive in a cell stacking direction, guide paths are provided to guide, in a specific direction, the adhesive applied to a joint surface of the separator member to be joined to the adjacent member. Thus, excessive adhesive is guided to the guide path, and associated disadvantages during joining can be eliminated.

15 Claims, 6 Drawing Sheets

(56) References Cited

FOREIGN PATENT DOCUMENTS

| | | |
|---|---|---|
| JP | A-2002-83614 | 3/2002 |
| JP | A 2002-231272 | 8/2002 |
| JP | A 2002-260691 | 9/2002 |
| JP | A 2002-367631 | 12/2002 |
| JP | A 2003-22826 | 1/2003 |
| JP | A 2003-123798 | 4/2003 |
| JP | A 2004-185811 | 7/2004 |
| WO | WO-03/005469 * | 1/2003 .............. H01M 8/02 |
| WO | WO-2004/047210 A2 * | 6/2004 .............. H01M 8/04 |

OTHER PUBLICATIONS

Machine Translation of JP 09-147890 (Jun. 1997).*
Japanese Office Action issued Nov. 9, 2010 for Japanese Patent Application No. 2004-135010 (with translation).
Jan. 10, 2012 Interrogatory issued in Japanese Patent Application No. 2004-135010 (with English translation).

* cited by examiner

SEPARATOR OF FUEL BATTERY, METHOD OF JOINING SEPARATOR, AND FUEL BATTERY

TECHNICAL FIELD

The present invention relates to a separator of a fuel battery suitable for being joined with an adhesive, a method of joining a separator, and a fuel battery.

BACKGROUND ART

In a fuel battery, a fuel battery cell serving as a single cell is constituted by a membrane-electrode assembly (MEA) comprising an electrolyte layer, such as a solid polymer membrane and diffusion layers of carbon cloth or carbon paper holding the electrolyte layer therebetween, and of separator members holding the membrane-electrode assembly therebetween, and a plurality of such cells are arranged or stacked (modularized) to construct a fuel battery. In such a single fuel battery cell, a hydrogen gas as an anode gas is supplied to a hydrogen gas flow channel groove of the negative side separator, and air (oxygen gas) as a cathode gas is supplied to an oxygen gas flow channel groove of the positive side separator. The supplied hydrogen gas and oxygen gas are diffused to a negative side diffusion layer and a positive side diffusion layer, respectively. The hydrogen gas which has reached the negative side diffusion layer then contacts a catalyst layer applied onto the solid polymer electrolyte membrane, and is dissociated into charged protons and electrons. The dissociated protons pass through the solid polymer membrane, move to a positive side, and react with the oxygen on the positive side to form water, thereby generating electricity. In general, a plurality of single cells having such a power generation mechanism is used and stacked via separators, such that the assembled fuel battery is constructed as a series-connected cell module or cell stack.

In order to bond the single cells of the fuel battery, a liquid adhesive is used, and the single cells of the fuel battery are joined by this adhesive. First, the liquid adhesive is applied onto a joint surface of one separator member. The applied adhesive is solidified by thermal hardening after the joint surface of this separator member is covered with an adjacent member. In this manner, the separator can be joined to the adjacent member by the adhesive. This liquid adhesive must be applied onto the joint surface (at least the entire outer peripheral edge) of the separator member because if any places, even small locations, remain where the adhesive is not applied, the gas flowing in the fuel battery may leak from the places where the adhesive is not applied when the separator is joined to the adjacent member. To prevent this, it is therefore necessary to adequately apply the adhesive to the separator member. That is, the adhesive has a function as a seal member.

The adhesive is preferably applied onto the joint surface (at least the entire outer peripheral edge) of the separator member as adequately as possible, but application of too much adhesive may lead to other problems. That is, if the thickness of the adhesive applied onto the entire the joint surface of the separator member is not uniform and there are places where the thickness of the applied liquid adhesive varies, surface pressure distribution may vary when the separator member is joined. For example, such a variation in the surface pressure distribution weakens the adhesion force between the MEA and the separator member by the adhesive, or increases the degree of electric loss (an increase in contact resistance) in the fuel battery. Moreover, between the separator member and the MEA, there is a possibility that the gas flow channels provided in the separator member may deform such that the gases will not flow along the designed flow channels.

A technique is known which, in view of such problems with the adhesive application amount and the surface pressure distribution, crosses a leading end and a terminal end when applying the liquid adhesive. At this point, it is considered that the separator member is preferably provided with a wide portion in a part where the leading end is joined to the terminal end.

Meanwhile, in the separator member onto which the adhesive is applied, a place where the application amount of the adhesive is great is first compacted, and then other portions with the adhesive are compacted such that the separator member is bonded to the adjacent member, when the separator member is bonded (sealed) with the adhesive to the adjacent member (e.g., the electrolyte membrane, the separator, a resin frame, etc.) opposite to the separator member in a cell stacking direction. Especially at a cross portion of the adhesive, the adhesive is applied so as to be superposed in two or more layers, which tends to create a bulky state.

At this point during assembly, because the surface pressure in such a bulky cross portion becomes higher than in other portions, the compacted adhesive spreads over the periphery of the cross portion. Especially, depending on the condition when the separator member is joined to the adjacent member with the adhesive, the direction and amount in which the compacted adhesive spreads out can vary.

A conventional separator member is provided with a wide portion at portions where the leading end crosses the terminal end. However, when the compacted adhesive disproportionately spreads within the space of the wide portion depending on the condition during the joining, the adhesive in some cases runs over from the wide portion in an arbitrary direction.

Such overflowing adhesive might, for example, enter and block the gas flow channels or a cooling fluid flow channel of the separator, or hamper the function of the MEA. Further, when the adhesive runs over into a manifold for the gas flow channels and the cooling fluid flow channel formed in the separator member, the adhesive hampers the flow of the gases or a cooling fluid. Moreover, when there is a possibility that the adhesive may overflow into the manifold, it may be necessary to include in the manufacturing process an additional process for removing the run-over adhesive. In addition, there is a possibility that deviation in the wide portion will lead to variations in the application amount (surface pressure) and impair the sealing function.

The present invention was made in view the above problems, and provides a separator of a fuel battery having a more suitable bonded structure and a fuel battery using this separator.

DISCLOSURE OF THE INVENTION

The present invention provides a separator of a fuel battery including a separator member to be joined to an adjacent member adjacent thereto with an adhesive in a cell stacking direction, wherein a joint surface of the separator member to be joined to the adjacent member is provided with guide paths to guide the applied adhesive in a specific direction.

Thus, when the separator of the fuel battery including the separator member is joined to the adjacent member with the adhesive in the cell stacking direction, the adhesive applied when the separator member is joined to the adjacent member is guided in a specific direction along the joint surface of the separator member to be joined to the adjacent member.

BEST MODE FOR CARRYING OUT THE INVENTION

Hereinafter, an embodiment of the present invention will be described with reference to the drawings. The present embodiment is one example of how the present invention can be implemented, and the present invention is not limited to this example embodiment.

Fuel Battery and Separator of Fuel Battery

Figure 1:
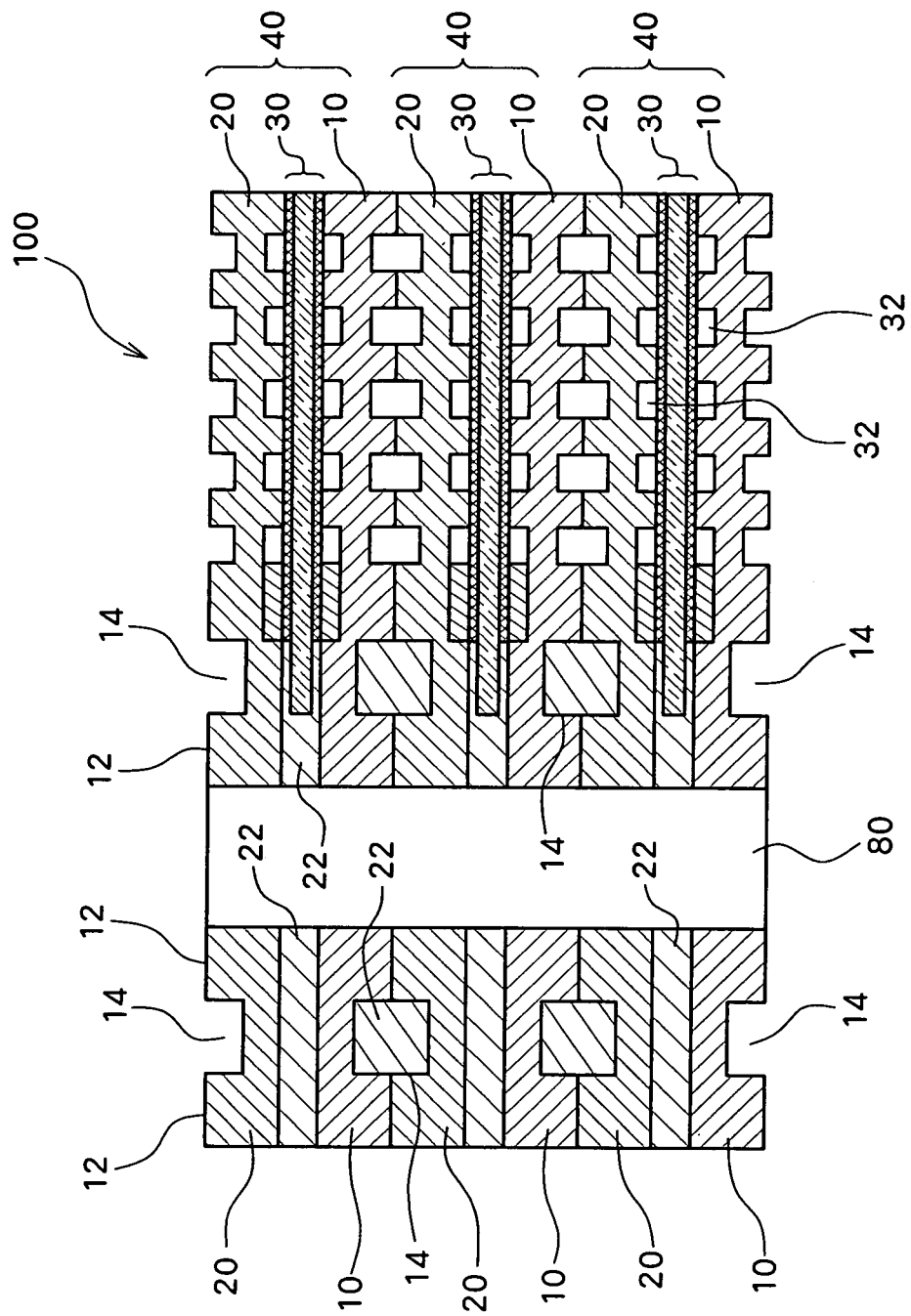
FIG. 1 is a sectional view of a fuel battery module according to an embodiment of the present invention.

A sectional view of a stack structure of a fuel battery 100 according to the present embodiment is shown in FIG. 1. The fuel battery 100 has a stacked structure in which a plurality of single fuel battery cells 40 are stacked (modularized). Here, each single fuel battery cell 40 has a structure in which an MEA 30 is held between a first separator member 10 and a second separator member 20. The first separator member 10 and the second separator member 20 correspond to adjacent members of each other.

A single fuel battery cell 40 is constructed by joining the MEA 30 between the first separator member 10 and the second separator member 20 with a thermosetting adhesive 22. The fuel battery stack structure 100 is produced so that the fuel battery cells 40 thus formed are further joined with the adhesive 22 and the fuel battery cells 40 are physically firmly bonded to form a cell module. The cell modules are further stacked to form a cell stack. Terminals, insulators, and end plates are arranged at both ends of the cell stack in a cell stacking direction, and the cell stack is fastened in the cell stacking direction, and then a tension plate extending in the cell stacking direction is fixed by bolts and nuts outside the cell stack, thereby constructing a fuel battery stack. In this manner, the fuel battery according to the present embodiment can be manufactured.

Figure 2:
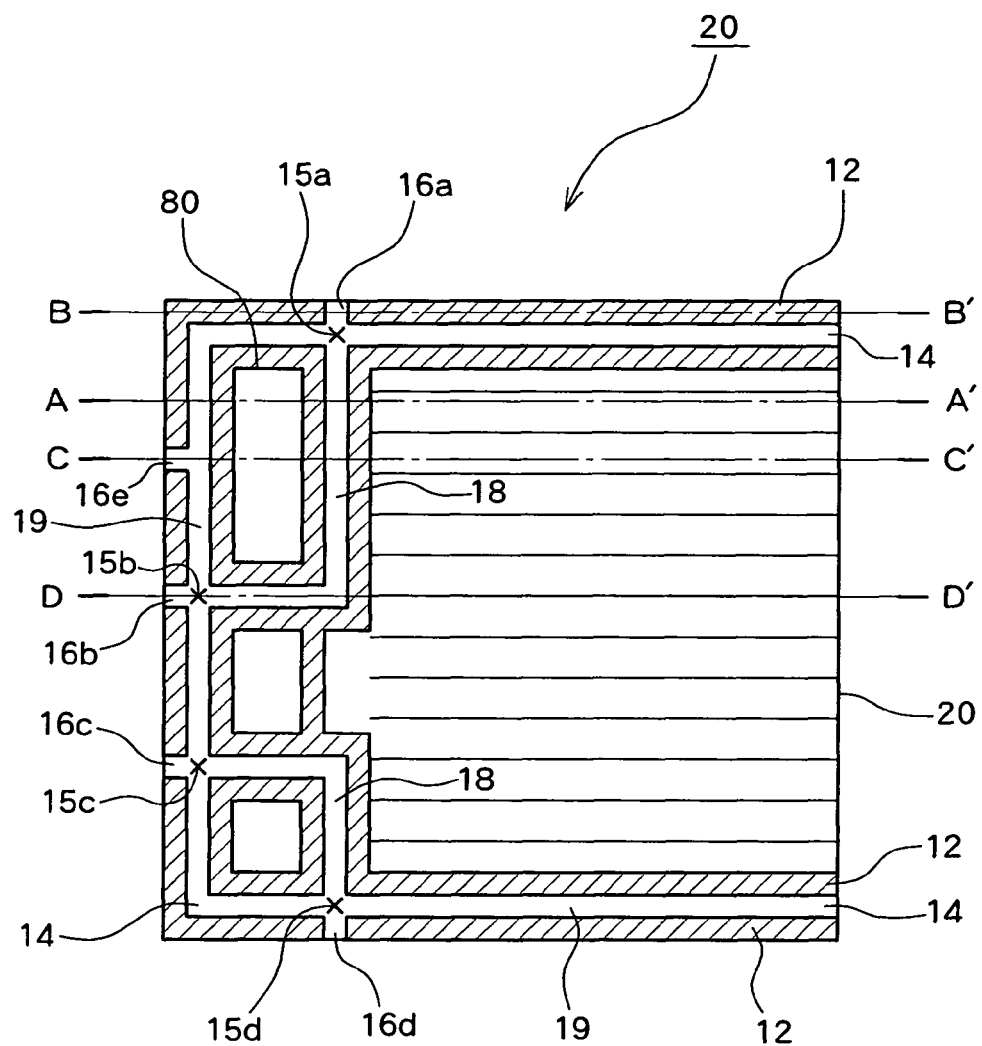
FIG. 2 is a plan view of a fuel battery separator according to the embodiment of the present invention.

A plan view of one second separator member 20 to be stacked in the fuel battery 100 is shown in FIG. 2. The second separator member 20 has convex walls 12 on its outer peripheral portions and on the outer peripheral portion of a manifold 80. Portions surrounded by the convex walls 12 are adhesive application grooves 14. Further, both the top surfaces of the convex walls 12 and the adhesive application grooves 14 surrounded by the convex walls 12 constitute a joint surface.

For the first separator member 10 and the second separator member 20, carbon, a metal, a resin, a conductive resin or the like can be employed. For example, it is possible to employ a combination of metal separators for the first separator member 10 and the second separator member 20, or a combination of carbon separators (molded articles comprising carbon and a resin for binding the carbon) for the first separator member 10 and the second separator member 20. In FIG. 1, the carbon separators are used for both the first separator member 10 and the second separator member 20.

Furthermore, the adjacent member can be at least one of the separator, an electrolyte membrane, the membrane-electrode assembly and a resin frame.

Moreover, the MEA 30 is formed in such a manner that a solid polymer membrane is held between diffusion layers at both poles. Here, a fluorine-based resin or the like may be used for the solid polymer membrane, and a general diffusion layer forming material such as carbon paper or carbon cloth may be used for the diffusion layers.

The first separator member 10 and the second separator member 20 have a plurality of gas flow channel grooves 32 on MEA contact surface sides for holding the MEA 30 at positions for holding the MEA 30 therebetween. The gas flow channel groove 32 is a concave groove, and a fuel gas and an oxidized gas for the fuel battery are supplied to the MEA 30 through the gas flow channel grooves. The gas flow channel 32 may be a serpentine flow channel extending from an entrance to an exit so as to turn back one or more times, or a straight flow channel extending straight from the entrance to the exit. As shown in FIG. 1, the fuel battery stack structure 100 has the manifold 80 connecting with the gas flow channels 32 so as to penetrate the separators for the passage or the gases of a cooling fluid.

A characteristic point of the present embodiment is that, as shown in FIG. 2, the first separator member 10 and the second separator member 20 have the adhesive application grooves 14 to which the adhesive is applied, and the convex walls 12 defining the adhesive application grooves 14.

The adhesive application groove 14 is a concave groove for which the convex walls 12 protruding from the surface of the second separator 20 serve as dams of lateral surface walls and the surface of the second separator 20 serves as a bottom surface. This structure makes it possible for the adhesive application groove 14 to have a function of retaining the adhesive. The adhesive application grooves 14 are provided in both the first separator member 10 and the second separator member 20, and the first separator member 10 and the second separator member 20 are arranged so that the adhesive application grooves 14 face each other after the adhesive 22 is applied thereto. Then, the first separator member 10 is joined to the second separator member 20 with the adhesive 22 retained in the adhesive application grooves 14, and the fuel battery cells 40 are formed into a stacked module. Hereinafter, the second separator member 20 will be explained by way of example.

Furthermore, the adhesive application groove 14 is divided into an outer peripheral adhesive application groove 19 provided in the outer peripheral surface of the joint surface of the second separator member 20, and an inner peripheral adhesive application groove 18 located in places other than on the periphery thereof and provided on the periphery of the manifold 80 and the like of the second separator member 20.

The convex walls 12 defining the adhesive application grooves 14 are dams protruding on the surface of the second separator member 20. The convex walls 12 are provided so as to enclose the outermost peripheral portion of the second separator member 20 and so as to enclose the periphery of the manifold 80. The convex walls 12 are provided in both separators to be joined together. When a cell module is formed, the convex walls 12 provided on the joint surfaces of both separators directly contact each other so that the separators are stacked, as shown in FIG. 1.

The convex wall 12 has a plurality of guide paths 16. The guide paths 16 penetrate from the outside of the second separator 20 into the adhesive application grooves 14. Openings are provided along the outer periphery of the convex wall 12 in order that the guide paths 16 will form openings. That is, because the concave adhesive application groove 14 is defined by the bottom surface of the second separator 20 and the convex walls 12, the convex walls 12 are formed with openings which serve as the guide paths 16.

The guide paths 16 (16a, 16b, 16c and 16d) are provided extending towards adhesive cross points 15 (15a, 15b, 15c and 15d) in the adhesive application grooves 14. Further, in the present embodiment, a guide path 16e is also provided in the ordinary adhesive application groove 14 where there is no cross point. It is to be noted that the guide path 16e is not necessarily required and can be omitted. Hereinafter, a place where the guide path 16 is provided and a place where the guide path 16 is not provided are described comparing sectional views thereof. The sectional configuration of the second separator 20 is disclosed in FIGS. 3 to 6.

Figure 3:
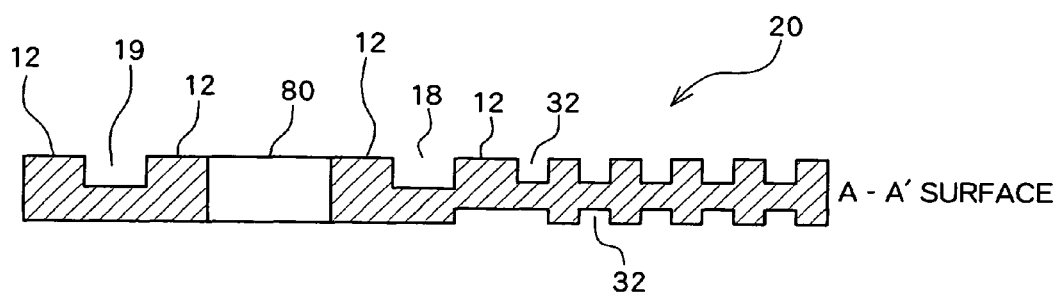
FIG. 3 is a sectional view of the fuel battery separator according to the embodiment of the present invention.

FIG. 3 shows a sectional view through the second separator 20 having adhesive application grooves 14 including a section of the manifold 80 in an A-A' surface having no guide path. In the sectional view shown here in FIG. 3, from the outside of the separator to an MEA holding portion (from left to right in the drawing), there are formed the convex wall 12, the outer peripheral adhesive application groove 19, the convex wall 12, the manifold 80, the convex wall 12, an inner peripheral adhesive application groove 18a and the convex wall 12.

Figure 4:
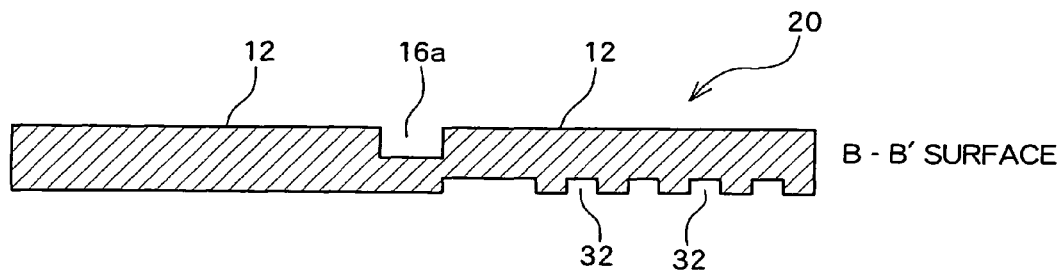
FIG. 4 is a sectional view of the fuel battery separator according to the embodiment of the present invention.

In FIG. 4, there is illustrated a sectional view through the outer peripheral portion of the second separator 20 along a B-B' surface thereof. In the configuration shown in FIG. 4, there are formed, from the outside of the separator to the MEA holding portion (from left to right in the drawing), the convex wall 12, the guide path 16a and the convex wall 12. The guide path 16a is formed by gaps in the convex wall 12. The bottom surface of the guide path 16a has such a structure as to continue from the bottom surface of the adhesive application groove 14. Having such a continuous structure, the guide path 16a is a concave groove, and is defined by the convex walls 12 serving as both lateral surfaces and by the surface of the second separator 20 serving as a bottom surface.

Figure 5:
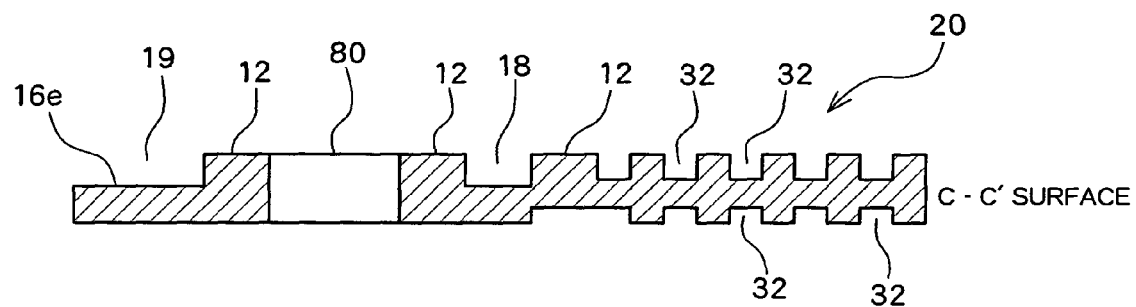
FIG. 5 is a sectional view of the fuel battery separator according to the embodiment of the present invention.

In FIG. 5, there is illustrated a sectional structure through the second separator 20 including the section of the manifold 80 in an C-C' surface having the guide path. In the configuration shown in FIG. 5, the guide path 16e, the outer peripheral adhesive application groove 19, the convex wall 12, the manifold 80, the convex wall 12, the inner peripheral adhesive application groove 18a, and the convex wall 12 are formed, in that order, from the outside of the second separator to the holding portion of the MEA 30 (from left to right in the drawing).

Figure 6:
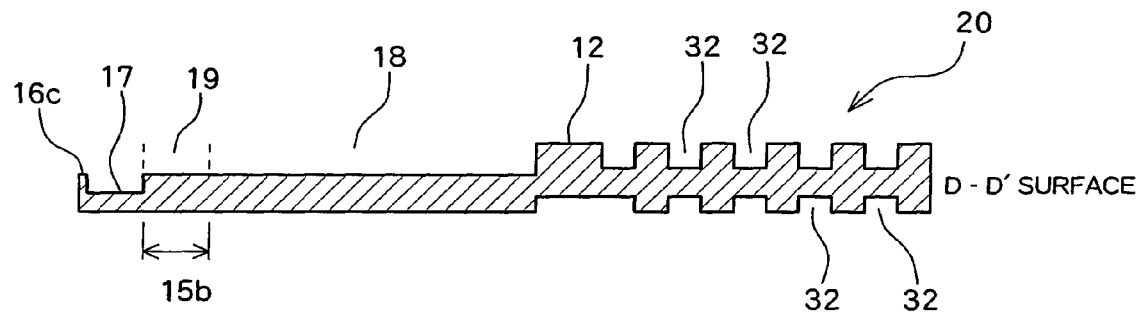
FIG. 6 is a sectional view of the fuel battery separator according to the embodiment of the present invention.

In FIG. 6, there is illustrated a sectional view through the second separator 20 along a D-D' surface. In the sectional view shown here, from the outside of the separator to the MEA holding portion (from left to right in the drawing), there are formed the guide path 16c, the outer peripheral adhesive application groove 19, the inner peripheral adhesive application groove 18a, and the convex wall 12. Here, the guide path 16c is provided with a concave depression 17. This concave depression 17 is provided in the bottom surface of the guide path 16c. This concave depression 17 serves as an adhesive reservoir to retain the guided adhesive. It is to be noted that the place to provide the concave depression 17 is not limited to the bottom surface of the guide path 16, and the concave depression 17 may be provided at an arbitrary place in the bottom surface of the adhesive application groove 14. Moreover, the adhesive reservoir is not limited to the concave depression 17, and may have any structure as long as it can store the adhesive. For example, various forms, such as a conical depression or a triangular-pyramid-shaped depression, may be employed.

The convex walls 12 are preferably provided on the periphery of the manifold 80 and in the outer peripheral portion of the second separator 20. The convex wall 12 provided on the periphery of the manifold 80 can prevent the adhesive from entering the manifold 80. The convex walls 12 provided in the outer peripheral portion of the second separator 20 can prevent the adhesive from overflowing from arbitrary places in the outer peripheral portion of the second separator 20. That is, because the separator in the present embodiment has a structure in which the adhesive is guided by the guide paths 16 to flow through specific egresses, it is possible to prevent a disadvantage that the adhesive overflows at arbitrary places.

The convex walls 12 provided on the periphery of the manifold 80 and in the outer peripheral portion of the second separator 20 can simplify a modularization jig structure used in a process of joining the MEA and the first separator 10 to assemble a unit cell. For example, owing to the presence of the convex walls 12, a flat plate jig which enables accurate modularization can be used as a modularization jig. Therefore, effects dependent on the modularization jig in a modularization process (e.g., effects on the variation of the thickness of the single cells) can be eliminated.

It is to be noted that the guide path is defined as a concave groove in which the convex walls 12 serve as lateral side walls (the guide path 16) in the present embodiment, but it is not limited to the use of the convex walls 12. Any configuration is possible as long as the guide path is provided so that the adhesive can be guided to a particular place.

Method of Joining Separator

Figure 7:
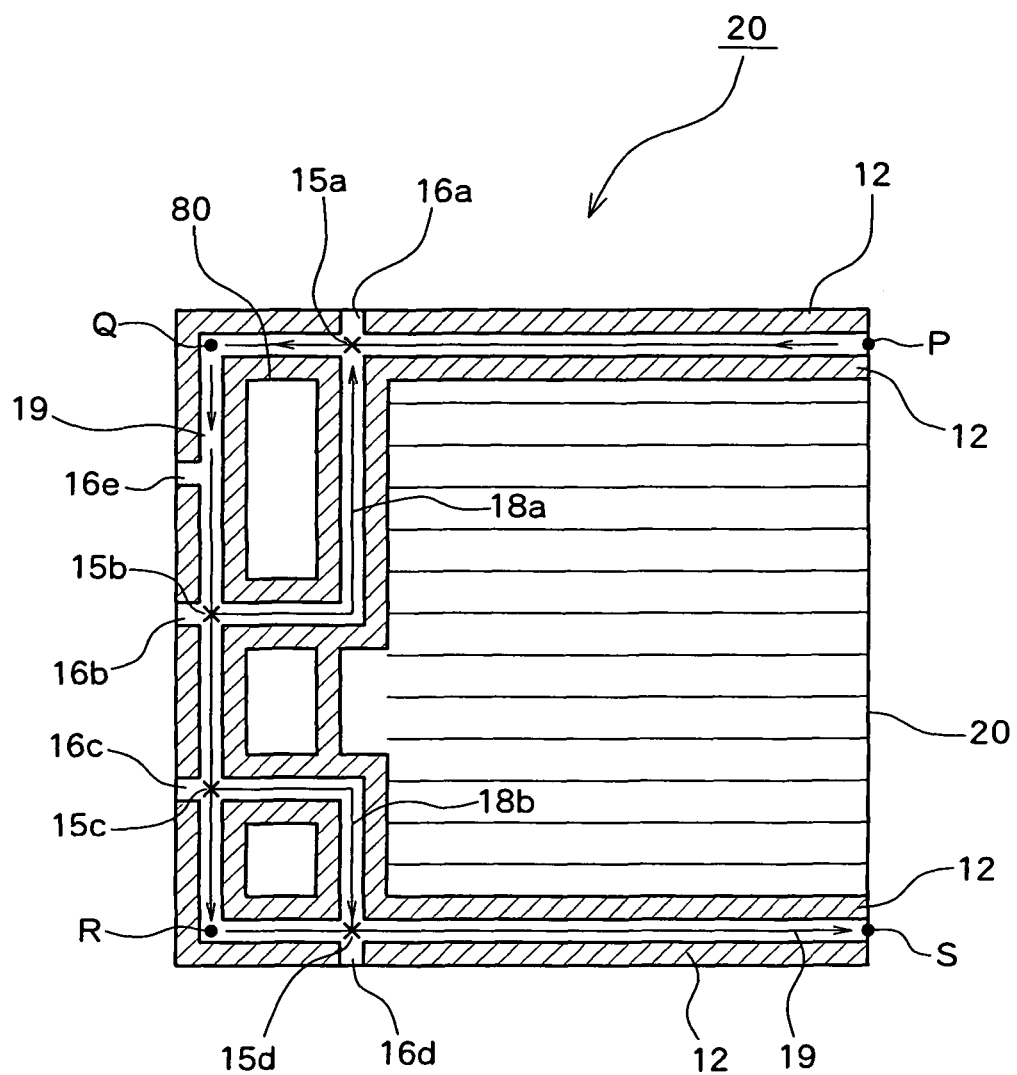
FIG. 7 is an explanatory diagram showing how an adhesive is applied to the fuel battery separator according to the embodiment of the present invention.

Next, application of the adhesive 22 to the second separator 20 along the adhesive application grooves 14 will be described. FIG. 7 shows how the liquid adhesive is applied in an arrow direction in the second separator along the adhesive application grooves 14. Here, a dispenser is used for application.

Figure 8:
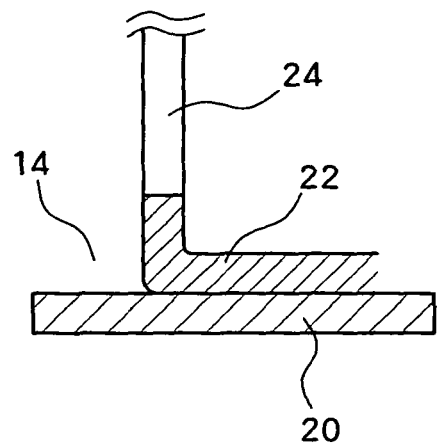
FIG. 8 is an explanatory diagram showing an adhesive application process according to the embodiment of the present invention.

FIG. 8 shows application of the adhesive 22 using the dispenser. The dispenser (not shown) comprises a dispenser nozzle 24. The adhesive application groove 14 as an application target is disposed immediately under an adhesive injection outlet of the dispenser nozzle 24. Together with the movement of the dispenser nozzle 24 over the adhesive application groove 14, the adhesive 22 is injected from the tip of the dispenser nozzle 24. Thus, the adhesive 22 is applied to the adhesive application groove 14.

A start point of the dispenser nozzle 24 is set at a point P. The dispenser moves along the outer peripheral adhesive application groove 19 from the point P (see arrows), thereby applying the adhesive 22. First, the adhesive 22 is applied so as to pass the cross point 15a and reach a point at a corner portion Q. Then, the corner portion Q is passed to reach the cross point 15b, and a corner portion R point is reached from the cross point 15b. Finally, after passing the corner portion R point, a point S, which is the end point of the adhesive application groove 14, is reached. In this manner, the adhesive 22 is applied to the outer peripheral adhesive application groove 19 enclosing the outer peripheral portion of the separator 20.

Next, after the adhesive 22 has been applied to the outer peripheral adhesive application groove 19, the adhesive 22 is applied to the inner peripheral adhesive application grooves 18 (18a, 18b). A method of application to the inner peripheral adhesive application groove 18a will be described. The adhesive 22 is applied to the inner peripheral adhesive application groove 18a by the dispenser from the cross point 15b to the cross point 15a. Here, the application is started from the cross point 15b in such a manner as to overlap the adhesive 22 applied to the cross point 15b so that there is no part where the adhesive 22 is not applied in the condition in which the adhesive 22 is crushed and spread out when bonded to the adjacent member. The corner portion is passed to reach the cross point 15a. At the cross point 15a, the adhesive 22 is also applied up to the position where it overlaps the cross point 15a so that no portion where the adhesive 22 is not applied remains.

Next, a method of applying the adhesive 22 to the inner peripheral adhesive application groove 18b will be described. This is similar to the method of applying the adhesive 22 to the inner peripheral adhesive application groove 18a. That is, the dispenser is used to apply the adhesive 22 to the inner peripheral adhesive application groove 18b from the cross point 15c to the cross point 15d. Here, the application of the adhesive 22 is started from the cross point 15c in such a manner as to overlap the adhesive 22 already applied to the cross point 15c so that there remains no part where the adhesive 22 is not applied. The corner portion is passed to reach the cross point 15d. At the cross point 15d, the adhesive 22 is also applied up to the position where it overlaps the cross point 15d so that no portion where the adhesive 22 is not applied remains.

The liquid adhesive 22 is applied along the adhesive application groove 14. Although a dispenser is generally used for this application, the present invention is not so limited, and other application methods, such as screen printing or the like, can also be employed. Moreover, the adhesive application groove 14 has the cross points 15. At the cross points 15, the liquid adhesive 22 is applied in a superposed state.

Figure 9:
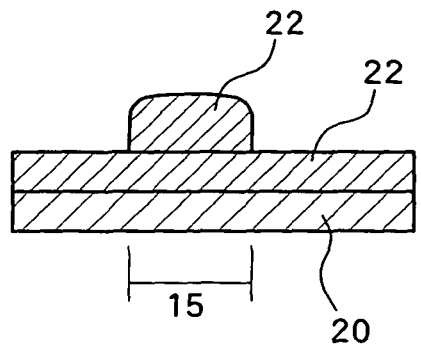
FIG. 9 is an explanatory diagram showing the adhesive application process according to the embodiment of the present invention.

When such an application process is carried out, only one layer of the adhesive 22 is applied in the adhesive application groove 14 except for the cross points 15, whereas the adhesive 22 is applied in two layers at the cross points 15 (15a, 15b, 15c and 15d) (FIG. 9). In this state, the separator member is joined to the adjacent member via an adhesive applied surface.

In this separator member joining method, the amount of the adhesive 22 applied at the cross points 15 (15a, 15b, 15c and 15d), where the adhesive 22 is double-layered, is greater than in the rest of the adhesive application groove 14 without the cross points 15. In some cases, the amount of the adhesive 22 is excessive. When joining the separator member, a buffer portion is required to remove the excessive adhesive 22. Without the buffer portion, the adhesive 22 may cross over the convex wall 12 to run over to the surface on the convex wall 12. Further, the adhesive 22 may reach the inner surface of the manifold 80.

In the second separator member 20 of the present embodiment, the guide paths 16 (16a, 16b, 16c and 16d) of the convex walls 12 are provided extending toward the cross points 15 (15a, 15b, 15c and 15d), so that the excessive adhesive 22 at the cross points 15 is guided to the guide paths 16 and expelled when the separator member is joined. At this point, it is also preferable that by reducing pressure on the periphery of a joint member of the separator member and the adjacent member, particularly in the vicinity of the openings of the guide paths 16, the excessive adhesive 22 is actively drawn into the guide paths 16.

As described above, the guide paths 16 of the convex walls 12 are provided to connect to the cross points 15, such that the excessive adhesive 22 is guided to the guide paths 16, and the amount of the adhesive 22 can be restrained from becoming excessive even at the cross points 15, thereby making it possible to secure a proper application amount of the adhesive 22.

In the present embodiment, the applied adhesive 22 can be actively guided and handled. Moreover, because the guide path 16 connects the adhesive application groove 14 with the outside of separator member, the adhesive 22 can be guided from the guide path 16 to outside of the separator member, so that the adhesive 22 may be expelled from the openings to outside the separator member. In such a case, it may also be preferable that pressure in the vicinity of the openings be reduced to actively discharge the excessive adhesive 22 from the openings. Thus, the excessive adhesive 22 can be guided to a desired location. Moreover, because since the adhesive 22 is discharged from particular places corresponding to the guide paths 16, the adhesive 22 need only be deburred in the outer surface of the separator member corresponding to the particular points. Therefore, a deburring process can be simplified.

The guidance of the adhesive 22 by the convex walls 12 and the guide paths 16 facilitates the removal of the excessively applied adhesive 22. Thus, it is possible to prevent the applied adhesive 22 from overflowing from application parts when joining the separator member. It is also possible to prevent disadvantages that the adhesive 22 overflowing from the application parts reaching the MEA to disturb the power generation of the fuel battery or the adhesive 22 overflowing into the manifold 80. In addition, it is not necessary to carry out a complicated deburring process within the manifold 80.

Furthermore, when the separator member is a metal separator, an anticorrosive layer is generally provided on the inner surface of the manifold. Therefore, there is conventionally a danger of releasing the anticorrosive layer if the adhesive adhering onto the inner surface of the manifold is deburred, such a disadvantage can also be prevented according to the present embodiment.

Especially, when the concave depression 17 is provided in the bottom surface of the guide paths 16c, the depression 17 can store the adhesive therein. Thus, the excessive adhesive 22 can be stored in the depression 17 when joining the separator member. In this manner, it is possible to prevent the adhesive 22 from overflowing through the guide paths 16c to outside the separator member, thereby eliminating any need for a deburring process in such locations.

When the guide path 16e is provided in the separator member, the location of the guide path 16e is preferably set in consideration of the possibility of overflowing of the adhesive 22. For example, it is conceivable that the separator member may cause distortion and that the distorted part may bulge so that the adhesive 22 overflows during the joining process. In consideration of this possibility, it is desirable to dispose the guide paths 16 in parts where distortion is more easily caused. The distortion is easily caused particularly when the separator member is a metal separator, and the provision of the guide path 16 is therefore effective in the parts where the distortion is easily caused.

It is to be noted that the place where the adhesive 22 is guided may be either or both of the guide path 16 and the concave depression 17. Whether either or both of these features are provided in the separator member may be decided in consideration of balances such as facility of manufacture etc.

INDUSTRIAL APPLICABILITY

The present invention can generally be applied to a separator of a fuel battery of a solid polymer type, phosphoric acid type, molten carbonate type, solid oxide type or the like.

The invention claimed is:

1. A separator of a fuel battery comprising a separator member and an adjacent member adjacent to the separator member in a cell stacking direction and joined to the separator member with an adhesive, wherein:
   application paths of the adhesive are provided on a joint surface of at least one of the separator member and the adjacent member, the application paths cross each other, and each application path comprises an application groove defined by convex walls provided on the joint surface as lateral surface walls,
   guide paths of the adhesive are provided on the convex wall by openings formed in parts of the convex wall, wherein at least one of the guide paths connects a cross point of the application paths to an outside of the separator with a straight line, the at least one of the guide paths comprises a concave groove defined by convex walls as lateral surface walls, the at least one of the guide paths is configured to guide redundant adhesive to the outside of the separator, and the at least one of the guide paths is flat and continues from the application paths, and
   a depression is formed on a bottom surface of the concave groove as an adhesive reservoir depressed with respect to the bottom surface of the application groove.

2. The separator of the fuel battery according to claim 1, wherein
   the joint surface is the joint surface of the separator member, and the at least one of the guide paths comprises the concave groove defined by the convex walls protruding from the surface of the separator member as lateral surface walls and by the surface of the separator member as a bottom surface.

3. The separator of the fuel battery according to claim 2, wherein
   the convex wall is provided on at least one of the periphery of a manifold and the outer periphery of the separator.

4. The separator of the fuel battery according to claim 1, wherein
   the adhesive reservoir is a concave depression.

5. The separator of the fuel battery according to claim 1, wherein
   the adhesive is a thermosetting adhesive.

6. The separator of the fuel battery according to claim 1, wherein
the separator member and the adjacent member are metal separators.

7. A fuel battery comprising a separator of a fuel battery according to claim 1.

8. A method of joining a separator of a fuel battery comprising a separator member and an adjacent member adjacent to the separator member in a cell stacking direction and joined to the separator member with an adhesive, the method comprising:
   providing application paths of the adhesive on a joint surface of at least one of the separator member and the adjacent member,
   providing guide paths of the adhesive connecting cross points of the application paths to an outside of the separator, at least one of the guide paths comprising a concave groove and a depression formed on a bottom surface of the concave groove, the at least one of the guide paths being flat and continuing from the application paths,
   applying the adhesive only on the application paths among the application paths and the guide paths, the adhesive being applied on the cross points of the application paths in a superposed manner,
   joining the separator member and the adjacent member via the surface on which the adhesive is applied, after the application of the adhesive to the application path, and
   guiding redundant adhesive to an outside of the separator and the adjacent member via the guide paths when the separator member and the adjacent member are joined.

9. The joining method according to claim 8, wherein
   the concave groove is defined by convex walls protruding from the surface of the separator member as lateral surface walls and by the surface of the separator member as a bottom surface.

10. The joining method according to claim 9, wherein
    the guide paths are produced by openings formed in parts of the convex walls.

11. The joining method according to claim 9, wherein
    the convex wall is provided on at least one of the periphery of a manifold and the outer periphery of the separator member.

12. The joining method according to claim 8, wherein
    the adhesive is guided to an adhesive reservoir provided on a joint surface of at least one of the separator member and the adjacent member.

13. The joining method according to claim 12, wherein
    the adhesive reservoir is the concave depression.

14. The joining method according to claim 8, wherein
    the adhesive is a thermosetting adhesive.

15. The joining method according to claim 8, wherein
    the separator member and the adjacent member are metal separators.

* * * * *